(12) United States Patent
Fischer (10) Patent No.: US 7,198,006 B2
(45) Date of Patent: Apr. 3, 2007

(54) CAT LITTER BOX

(75) Inventor: Klaus Fischer, Bonner Straβe 282, D-50968 Cologne (DE)

(73) Assignee: Klaus Fischer, Cologne (DE)

( * ) Notice: Subject to any disclaimer, the term of this patent is extended or adjusted under 35 U.S.C. 154(b) by 0 days.

(21) Appl. No.: 10/498,683

(22) PCT Filed: Dec. 2, 2002

(86) PCT No.: PCT/DE02/04417

§ 371 (c)(1),
(2), (4) Date: Mar. 9, 2005

(87) PCT Pub. No.: WO03/051105

PCT Pub. Date: Jun. 26, 2003

(65) Prior Publication Data

US 2005/0166854 A1 Aug. 4, 2005

(30) Foreign Application Priority Data

Dec. 14, 2001 (DE) .............................. 101 61 646

(51) Int. Cl.
*A01K 29/00* (2006.01)
(52) U.S. Cl. .................................................. 119/166
(58) Field of Classification Search ........ 119/165–168, 119/161
See application file for complete search history.

(56) References Cited

U.S. PATENT DOCUMENTS

| | | | |
|---|---|---|---|
| 4,120,264 A | 10/1978 | Carter | |
| 4,846,104 A * | 7/1989 | Pierson, Jr. | 119/166 |
| 5,178,099 A * | 1/1993 | Lapps et al. | 119/166 |
| 5,226,388 A | 7/1993 | McDaniel | |

(Continued)

FOREIGN PATENT DOCUMENTS

DE 297 18 260 U1 10/1997

(Continued)

*Primary Examiner*—Son T. Nguyen
(74) *Attorney, Agent, or Firm*—Mayer, Brown, Rowe & Maw LLP (57) ABSTRACT

A cat litter box with a pivotable container housed on a frame, the tray floor of which forms a collection tray for cat litter and the like. A cleaning mechanism is arranged standing in the container and reaching to the floor of the tray, with which cleaning mechanism, when the container is pivoted in one direction to clean it, waste matter, particularly feces, can be separated from the cat litter. The container possesses a storage chamber for the separated waste matter which can be moved with the container, which chamber is formed by a bag, the entrance of which chamber is arranged above the cleaning mechanism in the position of use. The tray floor consists in accordance with the invention of a half shell which extends over a span area of less than 250° which with a first part shell section forms the floor of an essentially open collection tray and with the other part shell section forms the rear wall of an interim storage tray for litter, whereby the cleaning mechanism is arranged at the transition segment between the part shell sections, and the storage chamber is arranged in the position of use on the side of the cleaning mechanism facing the interim storage tray and whereby the pivoting of the container from the position of use is restricted to a pivot movement of 120–180° in the one direction.

13 Claims, 6 Drawing Sheets

U.S. PATENT DOCUMENTS

| | | | |
|---|---|---|---|
| 5,259,340 A | * 11/1993 | Arbogast | 119/166 |
| 5,402,751 A | 4/1995 | De La Chevrotiere | |
| 5,507,252 A | 4/1996 | Ebert | |
| 5,662,066 A | * 9/1997 | Reitz | 119/163 |
| 5,752,465 A | * 5/1998 | Page | 119/166 |
| 5,823,137 A | * 10/1998 | Rood et al. | 119/166 |
| 5,911,194 A | 6/1999 | Pierson, Jr. | |
| 6,463,881 B1 | * 10/2002 | Reitz | 119/163 |

FOREIGN PATENT DOCUMENTS

EP     0 622 987 B1     4/1998

* cited by examiner

CAT LITTER BOX

BACKGROUND OF THE INVENTION

1. Field of the Invention

The invention relates to a cat litter box with a rotatable container positioned on a frame. The floor of the container forms a collection tray for cat litter, etc., with a mechanical cleaning mechanism positioned vertically in the container and reaching to the floor of the tray, with which waste matter, particularly feces, can be separated from the cat litter when the container is rotated in one direction to clean it and with a storage chamber for the separated waste matter which can be moved together with the container, the entrance to which is arranged in the position of use above the cleaning mechanism.

2. Discussion of the Prior Art

A large number of suggestions exist for cat litter boxes of the prior art which are automatically or semi-automatically cleaned. Known cat litter boxes can be subdivided into two groups according to their function. The first group, which have standing containers and moving cleaning rakes, include for example DE 297 18 260 U1, EP 622 987 B1 and U.S. Pat. No. 5,226,388. Since the cleaning rakes must be moved through the cat litter when it contains waste matter, the power output to be installed for the motor and the forces exerted on the cleaning rakes are relatively high. During the raking procedure, the forces also operate on the clumps of feces, which are bonded only by slight adhesive forces, and which, due to the design, have to be moved over relatively long distances through the clean cat litter, with the result that an undesirable abrasion of the clumps of feces results. The drive and guidance for the cleaning rake are relatively complex in their construction, and difficult to clean and to keep clean in daily use. They severely restrict the freedom of movement of the cat. In addition, corner areas remain which cannot be cleaned or cannot be sufficiently cleaned with moving cleaning rakes.

The invention is based on the second group of cat litter boxes, which have cleaning sieves arranged standing in the container and reaching to the floor of the tray. Cat litter boxes of this type are illustrated for example by U.S. Pat. No. 4,120,264, U.S. Pat. No. 5,402,751, U.S. Pat. No. 5,507,252 and U.S. Pat. No. 5,911,194. They each have a more or less cylindrical housing which is closed all around, and cleaning is accomplished by the housing performing a complete or nearly complete 360° revolution. Cat litter boxes pursuant to U.S. Pat. No. 5,402,751 or U.S. Pat. No. 5,507,252 are thereby constructed as containers which can be rolled off on the floor, while the housings of the other cat litter boxes are housed on a frame. The mechanically simplest solution is displayed by U.S. Pat. No. 5,911,194, which forms the generic starting point.

The generic cat litter box pursuant to U.S. Pat. No. 5,911,194 possesses an upper container part linked to two vertical frame supports. The open underside of the upper part of the container is connected to a floor formed as a tray. This upper part includes an entrance opening, having a closable flap, for the cat. A cleaning sieve is situated in the interior of the container in such a way that it separates around one fifth of the volume of the container as a sector. The container can perform a 360° revolution, in which all the cat litter is retained in the interior. The cat litter falls during the revolution of the container through the lattice sieve into the separate sector, and waste matter and feces remain on the outside of the cleaning sieve. The complete separation of cat litter and feces is accomplished after a revolution of approximately 150° to 180°. The cleaning sieve has a closed plate part which leads into an opening, on the rear side of which a collection bag or similar is stretched as a storage chamber. Through the further turning of the container, the sieved-out feces slip or roll through the sieve onto the plate appendage, from there into the opening, and then into the bag, while the sieved-out cat litter still remains in the separated sector. After completion of a 360° revolution of the container, the cat litter runs a second time through the sieve section of the cleaning rake, while the feces remain behind in the bag. The interior of the bag is to the maximum possible extent sealed off from the interior of the container as a result of the arrangement of the opening leading vertically upwards. The filled bag hangs in the position of use in that section of the cat litter box in which the cat should carry out its business, and it can be exchanged through an access opening in the upper side of the container.

In the use of this cat litter box, soiling of the cleaning sieve and the plate appendage and stronger traces of waste matter in the cat litter appear after a short time. These make excessively frequent replacement of the cat litter necessary. The power output of the drive motor which is necessary for the automatic turning of the container is comparatively high because of the kinematic of the cleaning movement for the cat toilet. A further disadvantage is that the closed construction of the container does not take account of the need of many cats to carry out their toileting in the open.

SUMMARY OF THE INVENTION

The task of the present invention is to create a cat litter box which can be cleaned automatically or semi-automatically through a simple, cost-effective and low-maintenance construction, which has as high as possible a self-cleaning effect which because of an improved kinematic of the cleaning movement makes less demands on the power output of the drive motor, and which takes account of the needs of cats particularly for freedom of movement etc.

This and additional tasks are accomplished by the invention. In accordance with the invention, it is foreseen that the floor of the container consists of a closed half shell which extends over a span area of less than 250°, preferably over 135–230°, which, with a first part shell section, forms the floor of an essentially open collection tray and with the other part shell section, forms the rear wall of an interim storage container for the litter, whereby the cleaning mechanism at the transition segment is arranged between the part shell sections, whereby the storage chamber in the position of use is arranged on the side of the cleaning mechanism which points to the litter retention tray, and whereby the rotation of the container from the position of use is restricted to a pivoting angle of 120–180° in one direction. With the solution in accordance with the invention, a cat litter box is therefore proposed which provides the cat with an open tray area for its use as a toilet which is not covered by a roof or by an over-spanned ceiling, and which because of the rotatability, the displaced interim storage tray for the litter and the mechanical cleaning mechanism positioned between the open collection tray and the interim storage tray for the litter, can be cleaned by an automatic or semi-automatic swivel movement of the container. During a cleaning swivel movement, the cat litter is lead across the cleaning mechanism into the interim storage tray for the litter, whereby the waste matter is sieved out of or taken up from the cat litter at the cleaning mechanism. The entrance to the storage chamber, which is directly situated next to the cleaning mechanism, guarantees that the sieved-out waste matter travels the shortest possible distances to the cleaning mechanism, so that the abrasion of waste matter which could contaminate the cat litter is minimized. A further advantage is that, because of the restricted swiveling movement and the tray sections arranged offset to each other, the relatively heavy cat litter is only moved and lifted up over a short distance, so that a drive motor of low power can be used.

In the preferred design, the collection tray and the interim storage tray for the litter are arranged roughly at right angles to one another, and intersect in a transition segment. This construction minimizes the volume required by the cat litter box, because the transition segment is both a component of the first partial shell section, which forms the collection tray, and a component of the partial shell section that forms the interim storage tray for the litter.

With the preferred method of construction in accordance with the invention, the entrance to the storage chamber is closed when in use, and can be automatically or manually opened during the cleaning movement. This design has the advantage that there is no cause for concern with regard to the odor inconveniences from the waste matter, which is sieved-out and contained in the odor-tight closed storage chamber in the position of use. It is particularly preferable for this purpose if the storage chamber is constituted of flexible material, particularly of a bag or the like, and/or if the entrance to the storage chamber extends over the whole container width or the width of the cleaning mechanism. The use of a flexible bag makes it possible to dispense with closure flaps for the entrance to the storage chamber. Where the storage chamber extends across the whole width, centering guide plates or the like which could become soiled by the moving waste matter during the swivel movement are also unnecessary. As well as this, the flexible bag can be arranged in such a way that it extends as far as directly next to the cleaning mechanism, so that all areas of the cleaning chamber that come into contact with waste matter can be replaced when the bag is replaced.

A mechanically simple and cost-effective solution for the openable and closable entrance is achieved in accordance with the invention by arranging two cross strips, which, in the position of use, lie one on top of the other, at the entrance to the flexible storage chamber. One of these strips is free and extends beyond the side pieces of the container, and the other can be moved together with the container. The side pieces of the container can then preferably possess a drive lug for the free cross strip and the upper sides of the side walls of the frame can form a guide path with a limit stop for the free cross strip, whereby the limit stop operates together with the free cross strip during the cleaning movement and accomplishes a relative movement between the free cross strip and the other cross strip which opens the entrance and whereby the drive lug positively returns the free cross strip to the starting position in a swivel movement in the opposite direction. In order to maximize the sealing effect at the entrance in the position of use, the free cross strip can preferably be raised from the guide path in the position of use of the cat litter box by means of the other cross strip. The solution described above in accordance with the invention accomplishes the opening and closing exclusively by positive forming and by gravity during the rotary movement.

Additionally suited to the purpose, the rotation of the container from the position of use is restricted to a pivoting angle of some 10–50° in the direction opposite to the swiveling up direction, so that the cat litter is again distributed essentially horizontally in the collection tray at the end of the cleaning process. In the simplest design of the cat litter box in accordance with the invention, the cleaning mechanism is formed by a cleaning rake with slit openings between cleaning struts. In accordance with the intention, the cleaning rake is then fastened in guides fitted to the interior walls of the side pieces from which it can be released, enabling it to be cleaned as the case arises or replaced with another cleaning rake. In addition, the interim storage tray for the litter and the interior wall of the collection tray can be well and simply cleaned when the cleaning rake is removed.

The swiveling movement of the container can either be accomplished by hand or be motor-driven, whereby with the motorized drive in particular, the restriction of the swiveling movement can be effected by the circuitry of the motor. In the preferred design of the cat litter box, the container can be housed in a sub-frame on roller guides and can be driven by a motor, with the rollers of the sub-frame being housed on the side walls of the frame, engaging in guide paths which are formed by beveled recesses with open rims on the side pieces of the container and transferring the working surfaces for the rollers opposite the tray floor to the axis of rotation.

BRIEF DESCRIPTION OF THE DRAWINGS

Further advantages and designs of the cat litter box in accordance with the invention arise from the following description of a design example illustrated diagrammatically in the drawing.

In the drawing.

DETAILED DESCRIPTION OF THE PREFERRED EMBODIMENTS

The cat litter box indicated in FIGS. 1 to 5, as well as in FIGS. 6A–6F, as an entirety with 10 possesses an essentially rectangular frame 1 and a rotatable container 20 housed in this. The frame consists of a floor plate 2 and two frame side pieces 3 and 4 which are welded or screwed to this and joined by cross pieces not shown, to the inner sides of which rollers 5 and 6 are attached for the rotatable housing of the container 20.

Figure 1:
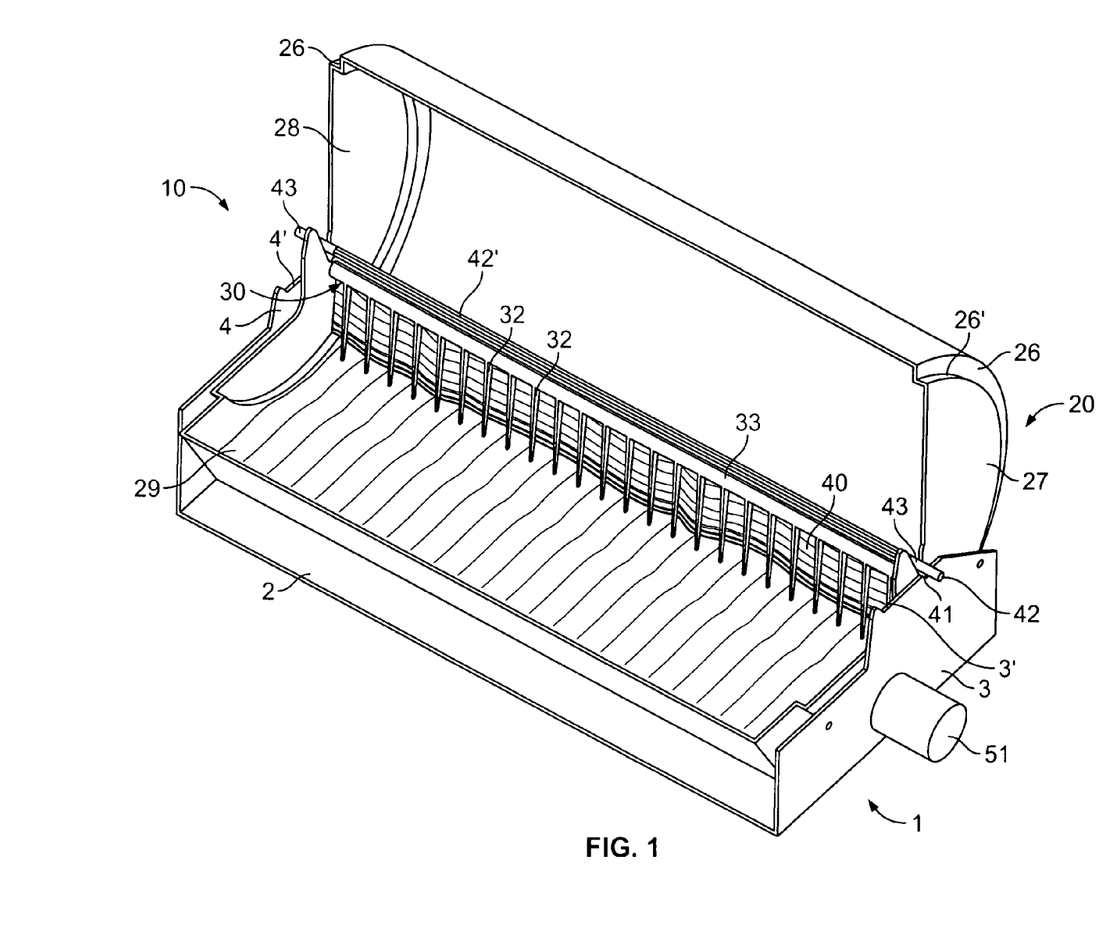
FIG. 1 gives a perspective view of a cat litter box from the front.
Figure 2:
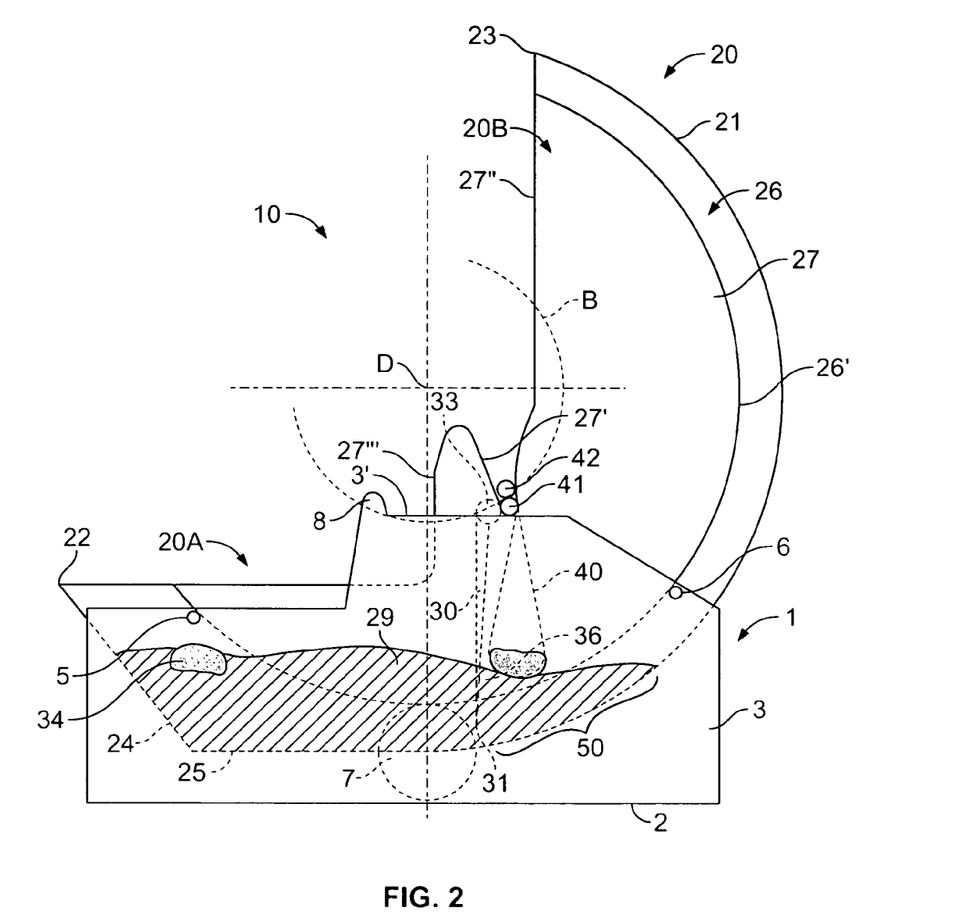
FIG. 2 shows a vertical section through the cat litter box from FIG. 1 in the position of use.

The container 20, which is constructed in the nature of a semi-cylinder arranged horizontally, possesses a tray floor 21 which extends essentially as half shell or a semi-cylindrical shell over a span area of about 230° between the left lower tray floor end 22 in FIG. 2 in the position of use and the right upper floor tray end 23. Near the lower tray floor end 22, the tray floor 21 itself diverges in the design example shown from the cylindrical shaping and is provided with a front plate 24 which in the position of use stands obliquely and a straightened floor section 25 which extends to the driver roller 7. The rollers 5 and 6 and the drive roller 7 engage with the container 20 in the guide paths 26', which are shaped in each case at the transition between the side pieces 27, 28 of the container 20 and its tray floor 21 and are formed by open-rim beveled recesses 26 on the side pieces 27 and 28 of the container 20 and the tray floor 21. The guide path 26' is circularly cambered around the axis of rotation D of the container over the whole area over which it extends. The working surface for the drive roller 7 and the guide rollers 5 and 6 is also displaced towards the axis of rotation D in relation to the tray floor 21 by the recess 26 and the recessed guide path 26'. The drive of the container 20 can be effected by interlocking with the guide path 26' or by means of a friction covering of the drive roller 7. To drive the drive roller 7, a motor as represented at 51 in FIG. 1 can be arranged in conjunction with the frame 1 and coupled with the drive roller 7, or it can be driven by hand such as by a crank mechanism as represented at 52 in FIG. 5.

The container 20 with its part shell section, illustrated in the position of use below in FIG. 1 and FIG. 2, which extends in front of the cleaning rake 30, forms a collection tray 20A open above for the cat litter 29, while the part shell section of the container 20 which extends vertically in the position of use constitutes an interim litter storage tray 20B with a front wall, here open. The transition segment identified as 50 in FIG. 2 forms both a partial section of the collection tray 20A for the cat litter 29 and a part shell section for the interim storage tray for the litter 20B. The lower end 31 of the cleaning rake 30, which extends to the inner wall of the tray floor 21, marks the beginning of the transition segment 50. The mechanical cleaning mechanism 30 itself consists, as can be seen from FIG. 1, of a cleaning rake with vertical struts 32 that proceed from a common cross strut which extends over the width of the container 20 between its side pieces 27, 28. The cleaning rake 30 is fastened in guides on the inner walls of the side pieces 27 and 28 in such a manner that it can be released, in a way not illustrated, and can be removed and replaced by another when necessary. With the intermediate spaces between the cleaning struts 32 of the cleaning rake 30, waste matter 34 is sieved out of the cat litter 29, which then, with a larger swivel angle, rolls under the force of gravity over one side 35 of the cross strut 33 into a storage chamber here formed by a bag 40, as explained in the following.

Figure 3:
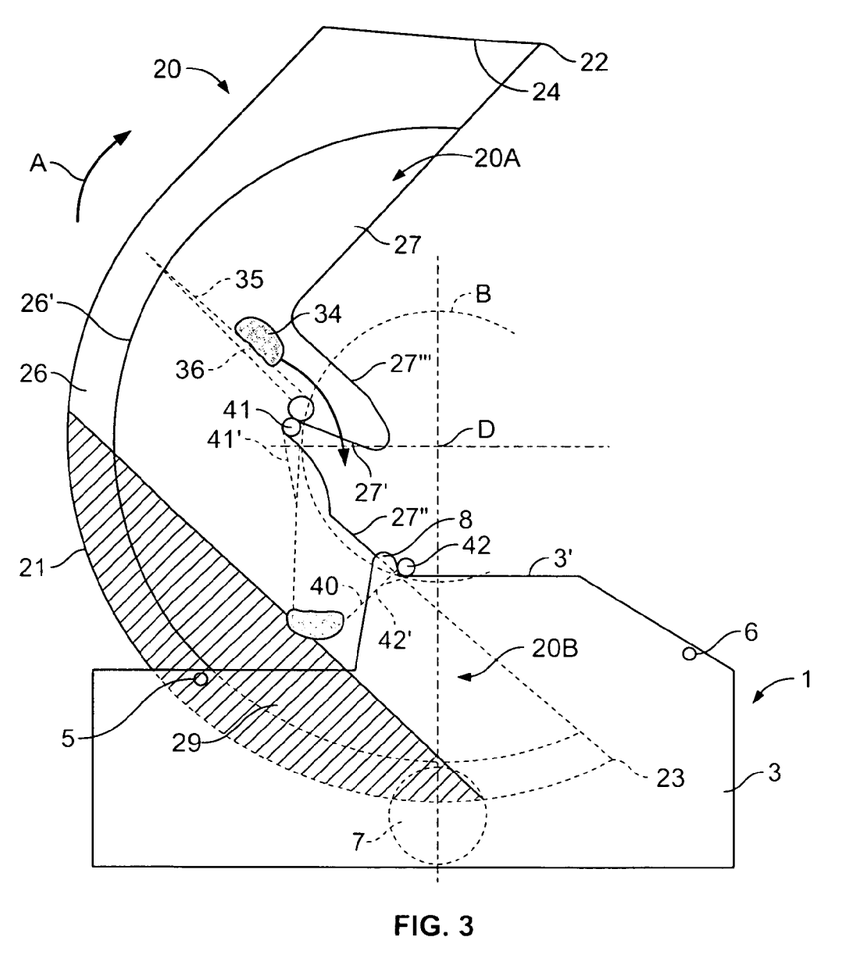
FIG. 3 shows the cat litter box in a pivoted position at the return point of the cleaning swiveling movement, as a cutaway in accordance with FIG. 2.
Figure 5:
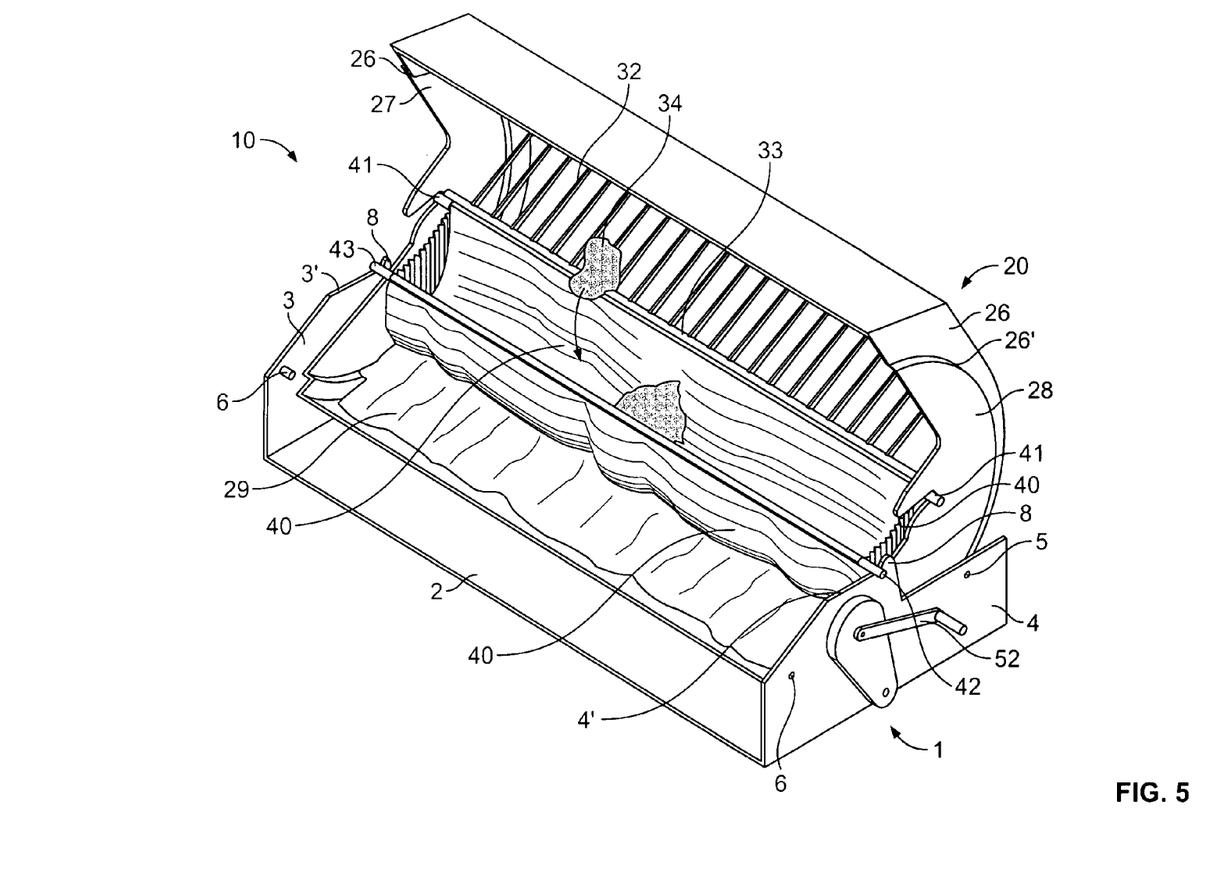
FIG. 5 shows a cat litter box similar to that of FIG. 1, but with a crank drive and in a position with the waste storage bag in a fully open position.
Figure 6A:
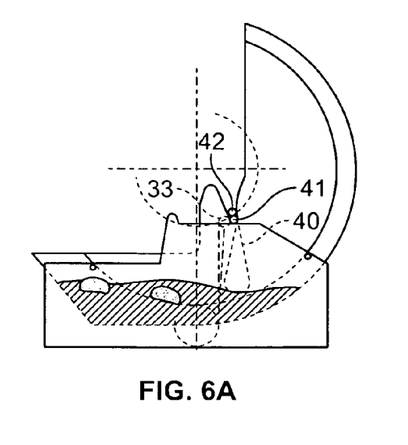
FIGS. 6A–6F show a series of pivotal positions of the cat litter box of FIG. 1.
Figure 6B:
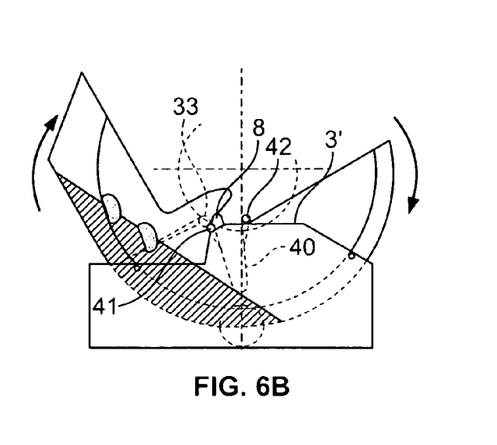
Figure 6C:
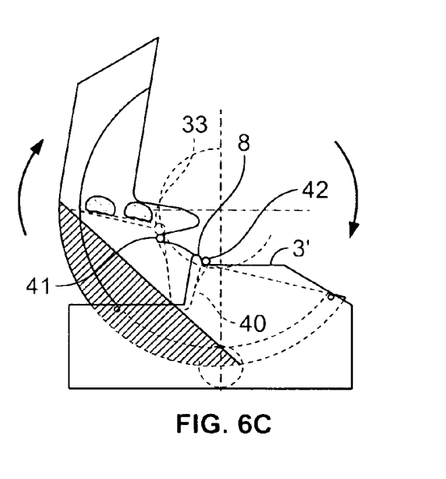
Figure 6D:
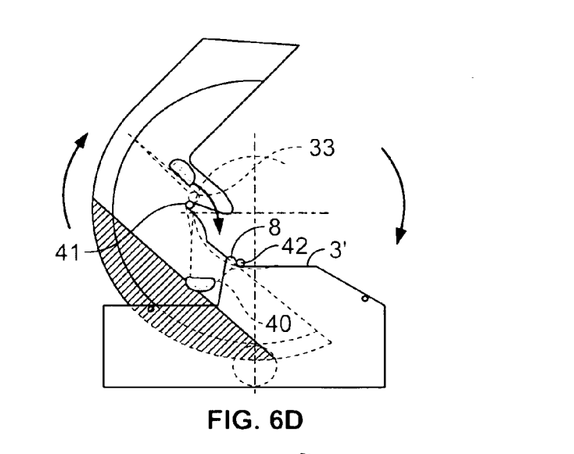

In order to automatically or semi-automatically sieve out the waste matter 34 which a cat leaves in the collection tray in the course of it doing its toilet, the container 20 is swiveled by a pivoting angle of up to 180° in direction A into an extreme position as in FIG. 3. The rotation of the container 20 from the position of use is restricted by a limit stop not shown or by the triggering of the electrical drive motor to a pivoting angle of 120–180° in the one direction A. During the continuous swiveling, as shown in FIGS. 6A–6C, the cat litter 29 falls through the intermediate spaces in the cleaning rake 30, whereby the waste matter 34 is restrained on the side 35 of the cleaning rake 30 which faces the collection tray 20A. After reaching the position shown in FIGS. 3, 5 and 6D (extreme position), the waste matter 23 rolls off under the force of gravity over the side 35 of the cleaning rake 30 and into the bag 40 forming the storage chamber, which is open in the extreme position (FIGS. 3 and 6D). In the position of use (FIGS. 2, 4 and 6A), in contrast, the bag 40 or its entrance is closed odor-tight and the bag 40 hangs within the litter retention tray 20B. It can thereby rest on the side 36 of the cleaning rake 30, which points to the litter retention chamber 20B.

Figure 4:
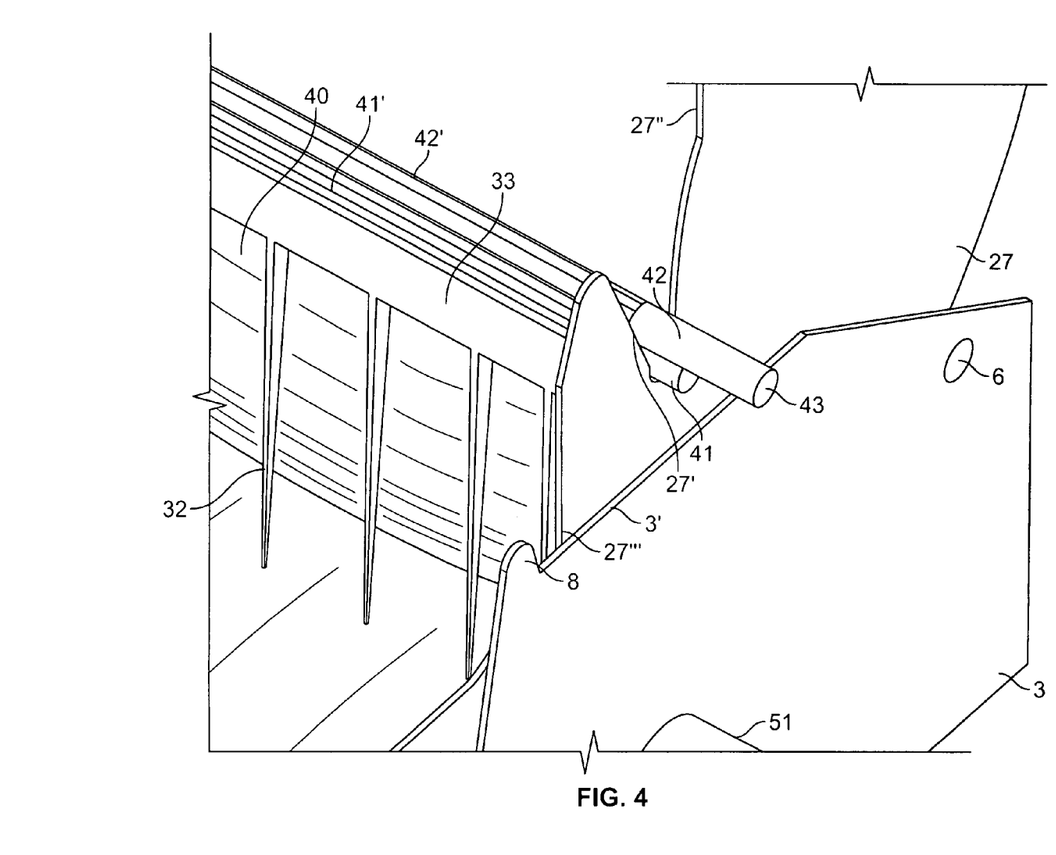
FIG. 4 shows a closer view of a portion of the structures in FIG. 1.
Figure 6E:
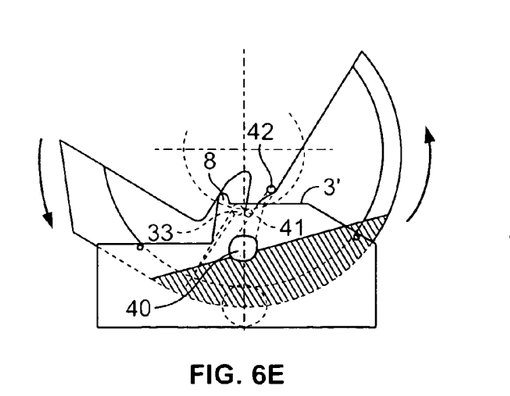
Figure 6F:
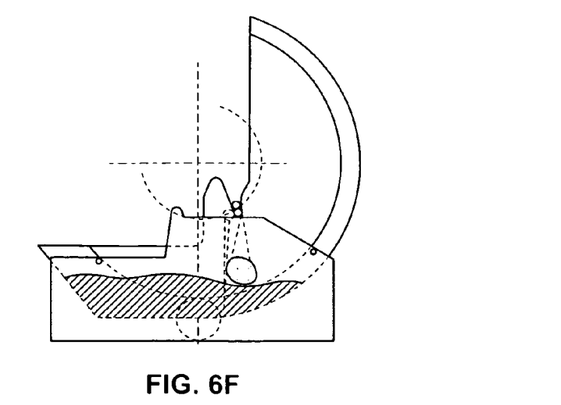

The opening of the entrance to the bag 40 takes place automatically during the swiveling movement of the container 20 in direction A, as shown in FIGS. 6A–6D, while the closing of bag 40 automatically on the return swiveling movement in the opposite direction, as shown in FIGS. 6E–6F. The bag 40, which hangs from respective strips 41, 41 via looped portions or sleeves 41', 42' as best seen in FIGS. 4 and 5, thereby moves exclusively within the litter retention chamber 20B, which thus fulfills a double function and creates the free space for the bag 40. In order to accomplish the automatic opening and closing during the swiveling movement without separate motors, two cross strips 41, 42 are arranged at the entry to the bag 40, of which one cross strip 41 can fall together with the cross strut 33 of the cleaning rake 30 and can be attached in an appropriately fixed location from which it can also be dismounted on the inner walls of the side pieces 27 and 28 of the container 20. The second, upper cross strip 42 lies loosely on the lower cross strip 41 and extends with the two strip ends 43 over the side pieces 27 and 28 of the container 20 and also over the frame side walls 3 and 4 (FIG. 1). The upper sides 3', 4', respectively, of the two frame side walls 3, 4, during the cleaning movement of the container in direction A, temporarily form a guide path for the upper cross strip 42, which is laid for this purpose over the strip ends 43 which extend beyond the side pieces 27 and 28 of the container on each upper side 3', 4'. The upper sides 3', 4' of the frame side walls 3, 4 run slightly diagonal to the horizontal position, falling towards the collection tray 20A, and end in the limit stops 8 which are formed by a lug proceeding upwards from the side walls 3, 4 of the frame, as seen stopping strip 42 in FIG. 5.

In the position of use as in FIG. 2, the upper cross strip 42 lies on the lower cross strip 41 and is slightly raised in relation to the upper sides 3', 4' of the frame side walls 3, 4, such that the clamping force at the entrance to the storage chamber or bag 40 is determined by the weight of the cross strip 42 and the weight of the waste matter contained in the bag 40. With the progressive swiveling of the container 20 in the direction A shown by the arrow, the strip ends 43 come into contact with the upper sides 3', 4' of the frame side walls 3, 4, such that the distance between the cross strips 41, 42, and thus also the opening of the entrance to the bag 40 are enlarged by the further pivoting of the container 20, as illustrated throughout the progressive pivoting positions in FIGS. 6A–6C, to the end position illustrated in FIGS. 3, 5 and 6D. The upper, free cross strip 42 thereby moves across the upper sides 3', 4' as far as the limit stop 8, without being able to pass by this. In the extreme position illustrated in FIGS. 3, 5 and 6D, the feces or clumps of waste can fall over the second cross strip into the fully open bag 40, which extends across the whole width of the container 20. With the return swivel motion in the opposite direction, the distance between the cross strips 41 and 42 gradually becomes diminished, as is shown in the movement from FIGS. 6D–6F. Some 50–30° before reaching the position of use, a drive lug 27' on the frame side walls 27 and 28 comes into contact with the upper cross strip 42, and gradually pushes this across the guide path back to the rear. The drive lug 27' thereby forms an approximately V-shaped notch together with the front wall 27" which prevents the free cross strip 42 from being able to leave the guide path on the upper side 3' of the frame side walls 3, 4. The side partial wall sections 27", 27"' before and behind the drive lug 27' extend vertically in the position of use (FIGS. 2 and 4). As can easily be recognized from the Figures, the side pieces 27, 28 are roughly crescent-shaped and each rise only a short distance laterally above the collection tray 20A and the litter retention chamber 20B. The V-shaped notch, the drive lug 27', the guide path and the limit stop 8 accomplish the opening during the swiveling movement and the subsequent closing of the entrance of the storage chamber, again shown here as bag 40, likewise moved during the swiveling movement, exclusively by positive forming. The free cross strip 42 can also be moved on the same circular path B as the cross strip 41 and the cross strut of the cleaning rake, so that drive agents can be provided on the cleaning rake to form drives.

The invention claimed is:

1. A cat litter box comprising a container that holds cat litter and is pivotably connected to a frame, the container having a tray floor forming a collection tray portion and an interim storage portion and having a transition portion spanning part of the collection tray portion and part of the interim storage portion, the container being pivotable from a first position to a tilted second position through an arc of less than 250°, a cleaning mechanism being positioned substantially vertically within the container and reaching toward the tray floor when the container is in the first position, the container being pivotable in a first direction toward the tilted second position thereby causing waste matter to be separated from the cat litter as the cat litter moves through the cleaning mechanism, the cat litter box further comprising a storage chamber for the separated waste matter wherein the separated waste moves into the storage chamber when the container is rotated to the tilted position, the storage chamber having an opening connected to first and second opposed cross strips, the cross strips being located directly above the cleaning mechanism and in a position holding the storage chamber closed when the container is in the first position.

2. The cat litter box of claim 1 wherein the collection tray and the interim storage tray are arranged essentially at a right angle to one another and intersect in the transition segment.

3. The cat litter box of claim 1 wherein the opening to the storage chamber is automatically opened as the container is pivoted from the first to the second position.

4. The cat litter box of claim 3, wherein the two cross strips are returned to the position located directly above the cleaning mechanism to hold the storage chamber in a closed position with the first cross strip lying on top of the cleaning mechanism and the second cross strip lying on top of the first cross strip.

5. The cat litter box of claim 4, wherein the container further comprises side pieces each having a drive lug to engage the second cross strip and the frame further comprises side walls that have upper sides that form a guide path with limit stops for the second cross strip, whereby the limit stops operate together with the second cross strip during pivoting of the container and accomplish a relative movement between the first cross strip and the second cross strip which opens the opening of the storage chamber and whereby the drive lug positively returns the second cross strip to the position on top of the first cross strip when the container is pivoted in the opposite direction to the first position.

6. The cat litter box of claim 5, wherein the second cross strip is raised from the guide path in the tilted second position of the container.

7. The cat litter box of claim 1 wherein the opening to the storage chamber comprises a flexible material that is connected to the cross strips.

8. The cat litter box of claim 1, wherein the pivoting of the container from the first position to the tilted second position is restricted to a pivoting angle of 120–180° in a first direction.

9. The cat litter box of claim 8, wherein the pivoting of the container in the opposite direction is restricted to a pivoting angle of 10–50°.

10. The cat litter box of claim 1, wherein the cleaning mechanism is a rake with slit openings between cleaning struts.

11. The cat litter box of claim 10, wherein the cleaning mechanism is a rake, and the rake is removably engaged in guides on the container side pieces.

12. The cat litter box of claim 1, wherein the container is housed in a frame on roller guides and is driven by a motor with rollers being housed on side walls of the frame, the rollers engaging guide paths formed by on side pieces of the container.

13. The cat litter box of claim 1, wherein the container is housed in a frame on roller guides and further comprising a hand crank connected to the container, with the rollers being housed on side walls of the frame, the rollers engaging guide paths formed by on side pieces of the container.

* * * * *